(No Model.)

J. B. SMITH & L. E. BARKER.
NUT LOCK.

No. 267,269. Patented Nov. 7, 1882.

Witnesses:
A. M. Fong.
W. J. Osgood.

Inventor.
John B. Smith
Luke E. Barker
per Howard A. Snow
Attorney.

UNITED STATES PATENT OFFICE.

JOHN B. SMITH AND LUKE E. BARKER, OF GREENWICH, OHIO.

NUT-LOCK.

SPECIFICATION forming part of Letters Patent No. 267,269, dated November 7, 1882.

Application filed June 26, 1882. (No model.)

*To all whom it may concern:*

Be it known that we, JOHN B. SMITH and LUKE E. BARKER, citizens of the United States, residing at Greenwich, in the county of Huron and State of Ohio, have invented certain new and useful Improvements in Nut-Locks, of which the following is a specification, reference being had therein to the accompanying drawings.

Our invention relates to nut-locks; and it consists in the construction and arrangement of its several parts, as will be hereinafter fully set forth, and pointed out in the claims.

Figure 1:
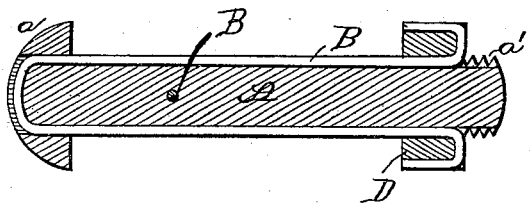
Figure 2:
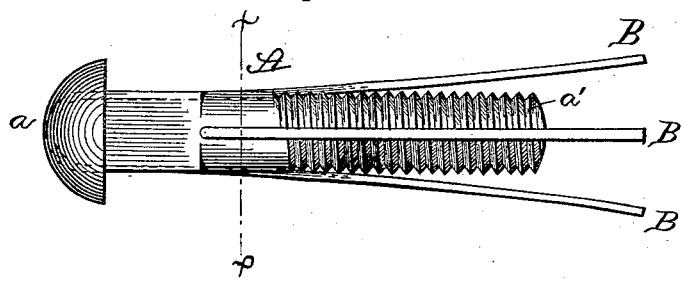
Figure 3:
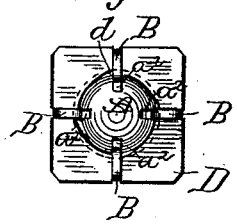
Figure 4:
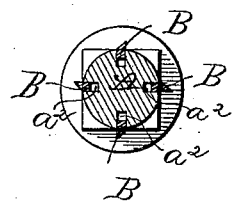
Figure 5:
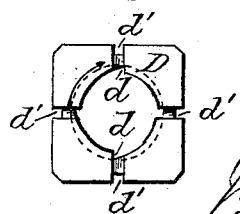

In the drawings, Figure 1 is a longitudinal section of a bolt and nut, showing the application of our lock thereto; Fig. 2, a side view of a bolt with our spring-bars arranged thereon; Fig. 3, a top plan view of the bolt and nut; Fig. 4, a cross-section of the bolt on the line $x\,x$, Fig. 2; and Fig. 5 is a top plan view of the nut.

A is a bolt, which may be of any desired length or thickness, and is provided with a head, $a$, and threads $a'$, as shown; but along the bolt and deeper than the threads are square parallel grooves $a^2$. One or both of these grooves, upon opposite sides, extend through and around the head of the bolt, as shown in Fig. 1, or one may extend around the head and another through the bolt, as shown in Fig. 2.

B are lock-rods placed in the grooves $a^2$ to lock the nut, and when in position extend slightly beyond the end of the bolt. The portions of the rods which enter the grooves of the bolts are square, so that they will not twist, and the outsides are beveled, so as to catch in the notches around the bore of the nut. They are bent U-shaped, and are inserted into the grooves $a^2$ through the head of the bolt, as shown in Fig. 1. The object of inserting the bolt-rods through the head and around the end of the bolt instead of through its body below the head is that by the former method the bolt is not weakened and the rods are more easily withdrawn. If, however, one of the grooves extends through the bolt instead of around the head, the rod must be inserted through the bolt straight and bent after it is in position. When in position and unconfined by the nut the bars spring away from the bolt, as shown in Fig. 2.

D is the nut. It has notches $d$ cut along the threads to receive the lock-bars, and around its sides are notches $d'$, by which it is finally secured to the bolt, as shown in Figs. 1 and 3.

In the operation of the device the rods B are pressed into the grooves of the bolts by the hand, and the bolt inserted through the parts to be secured, and the nut is screwed on the bolt. The rods, by reason of their elasticity, will press outwardly against the thread of the nut, and will spring into the notches $d$, but will pass out along the inclined sides of said notches. If, however, it is attempted to unscrew the nut, the rods B will spring into the notches $d$ of the nut, bear against the vertical sides of said notches, and prevent the nut from unscrewing. Before the nut can be removed the rods must be pressed by their projecting ends into the bottoms of the grooves $a^2$, whereby the rods are released from the notches $d$ and the nut allowed to turn freely. In order to firmly secure the nut on the bolt, the ends of the rods are bent over into the notches $d'$ in the face of the nut, which prevents lateral displacement of the ends of the rods, and they are then bent into the notches $d'$ in the outer walls of the nut, by which the rods are held firmly in the notches $d$ and the nut prevented from turning.

What we claim is—

1. The bolt A, having grooves $a^2$ extending along the thread and deeper than it, through and around the head of the bolt, as shown, in combination with the rod B and nut D, having notches $d$, substantially as shown and described.

2. The rods B, having their outer surfaces beveled and adapted to operate in the grooves $a^2$ of the bolt A, in combination with said bolt, and the nut D, having notches $d$ and $d'$, substantially as shown and described.

In testimony whereof we affix our signatures in presence of two witnesses.

JNO. B. SMITH.
     LUKE E. BARKER.

Witnesses:
 GEO. W. BASFORD,
 N. J. WHEELER.